FACSIMILE TRANSMITTING MEANS AND METHOD OF USING SAME

Filed Jan. 31, 1948

INVENTOR.
B. L. KLINE
BY
ATTORNEY

Patented Oct. 30, 1951 2,572,871

UNITED STATES PATENT OFFICE 2,572,871

FACSIMILE TRANSMITTING MEANS AND METHOD OF USING SAME

Bernard L. Kline, Manhasset, N. Y., assignor to The Western Union Telegraph Company, New York, N. Y., a corporation of New York Application January 31, 1948, Serial No. 5,568

9 Claims. (Cl. 178—5)

This invention relates to the telegraphic facsimile transmission of messages from a transmitting blank by means of an electrical stylus which scans the blank, and more particularly to a novel facsimile transmitting blank and a more facile and inexpensive method of preparing and utilizing a facsimile transmitting blank for producing facsimile signals.

A considerable number of firms and business houses which have need for prompt and efficient telegraph service do not have a sufficiently high daily volume of telegraph business to justify the cost of installing and maintaining send-receive telegraph printers or conventional facsimile send-receive apparatus in their offices, and yet their telegraph business is too large to rely on messenger pickup and delivery for telegrams transmitted and received. The present invention enables transmitting and/or recording facsimile apparatus to be employed for such classes of service, which apparatus is sufficiently simple and inexpensive as to justify the use of the same to handle the business of patrons having comparatively small telegraph accounts. Moreover, the invention provides a facsimile transmitting blank which may be utilized not only with alternating current pickup but also with low voltage direct current pickup. The blank may be prepared with a minimum of skill and experience; any typist can prepare the facsimile transmitting blank in the same manner as in making carbon copies of letters on a typewriter, simultaneously with the production of a ribbon copy and carbon copies of a message. A standard typewriter, without any changes or additions thereto and without requiring special ribbons or inking devices, may be used to prepare the transmitting blank by usual typing methods. For the reception of facsimile messages on the transmitter-recorder conventional electrosensitive recording blanks may be utilized.

Among the objects of the invention are to produce facsimile transmitting signals in a more facile and inexpensive manner; to enable simple, low cost apparatus to be employed both for the transmission and reception of telegrams or other messages; to prepare a suitable inexpensive facsimile transmitting blank by conventional writing or typing procedure; to enable the production of an original and, if desired, the usual carbon copies, of either a handwritten or a typewritten message simultaneously with the preparation of a facsimile transmitting blank containing the message; and to produce such a blank which may be used for the repeated transmission or retransmission of a facsimile message.

Figure 1:
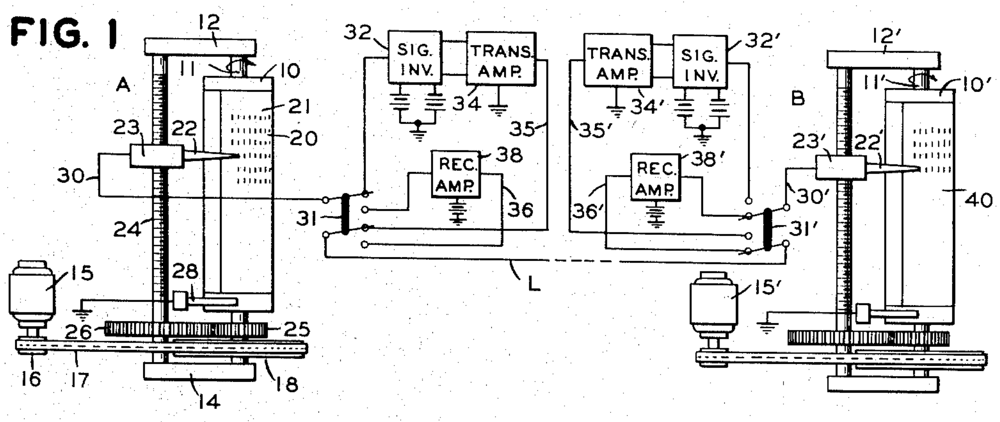
Figures 2, 3:
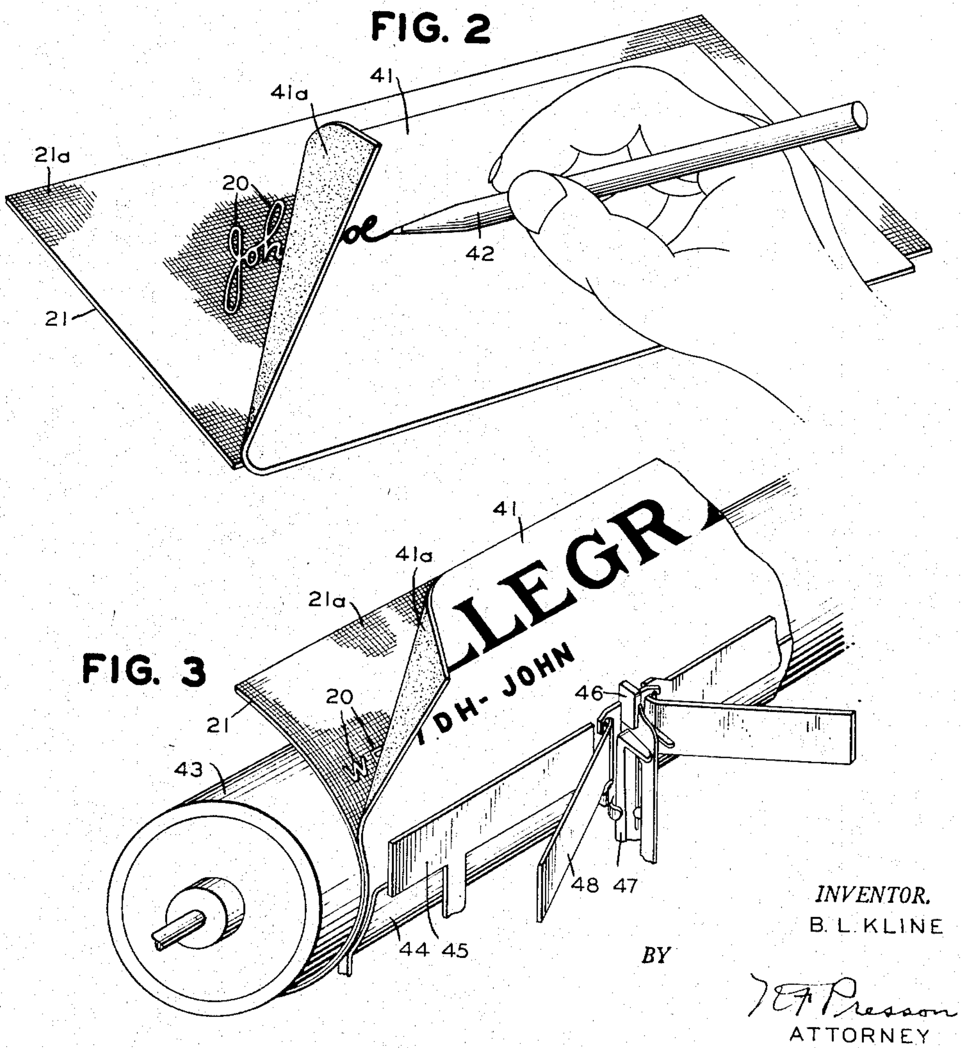

Other objects and advantages will be apparent from the following detailed description of the invention, taken in connection with the accompanying drawings, in which:

Fig. 1 diagrammatically a send-receive facsimile system suitable for utilizing transmitting blanks prepared in accordance with the invention;

Fig. 2 shows a method of writing by hand to produce a transmitting blank of the character disclosed herein; and Fig. 3 shows how the transmitting blank may be prepared on a conventional typewriter.

In the instant method of transmitting facsimile signals representing the handwritten or typewritten message, the characters or other subject matter are formed by impressing a suitable dielectric substance, having certain characteristics hereinafter set forth, upon selected elemental areas of a transmitting blank which may comprise a sheet of paper or other suitable flexible material. In accordance with one embodiment, the paper sheet, or at least the transmitting surface portion thereof, is inherently a good conductor for the transmitting stylus current. Thus, the blank may be made conductive, either by incorporating in the paper pulp or by impregnating or coating the paper sheet with, a suitable electrolyte or a finely divided conducting material uniformly disposed throughout the paper or the surface thereof, after which the characters comprising the message are impressed on the surface of the blank so that they form insulating characters on a conductive background.

In another embodiment, the blank initially may be nonconductive, as in the case of ordinary paper stock, and after the insulating characters are impressed thereon, the blank is made conductive by applying thereto a suitable electrolyte prior to or during a transmitting operation. The nature of the material of which the impressed characters are composed is such that it repels the electrolyte and causes the characters to remain as insulating elemental areas on a conductive background during transmission of the message.

In both of the foregoing embodiments, so long as the transmitting stylus is in contact with the conducting background of the blank during a scanning operation, signal current will flow in the stylus circuit, but when the stylus is traversing the dielectric characters, the stylus circuit is effectively opened and no signal current flows therein. The facsimile signals transmitted are in accordance with the alternate presence and absence of current flow in the stylus circuit as the blank is being scanned. These signal currents are amplified or are caused to modulate or control other currents to produce increased signal strength; preferably, although not necessarily, the signals are passed through a signal inverter in order that at the receiving end the recorded message will be a black on white copy of the message on the transmitting blank.

Referring now to Fig. 1 of the drawings, there is illustrated simple and inexpensive facsimile apparatus at stations A and B interconnected by a transmission line L. Station A may be located, for example, in a patron's office, and station B either at another patron's office or it may represent the receiving position of a telegraph company which retransmits the received message over commercial lines to its destination. As shown, the facsimile units at the two stations may be identical, and each is adapted both for transmitting and receiving messages by electrical pickup and electrical recording methods respectively. Each of the facsimile units comprises a transmitting and recording metallic cylinder or drum 10 carried by a centrally disposed driving shaft 11 which is journalled in frame members 12 and 14. In transmitting and receiving signals the cylinder is rotated, in the direction indicated by the arrow, by any suitable means such as an electric motor 15, preferably of the alternating current synchronous type, which is connected in the illustrative form shown by a driving pulley 16 and a belt 17 to a driven pulley 18 keyed to the shaft 11. To prevent slippage, the pulleys have pins thereon which are received in slots in the belt, as indicated.

The characters or images 20 comprising the subject matter, such as a telegram, to be transmitted, are impressed by means of a substance hereinafter disclosed, which preferably is a dielectric substance, on a sheet 21, for example, a paper telegraph blank, after which the sheet is wrapped once around the metallic cylinder 10 in the manner shown in the figure and releasably secured to the cylinder in any desired manner, as by elastic retaining bands such as disclosed in Patent No. 2,255,868, issued September 16, 1941. A scanning electrode or metal stylus 22, whose point bears on the surface of the paper sheet 21 with a pressure usually of 8 to 10 grams, is supported by a travelling carriage 23 adapted for movement longitudinally along a rotatable shaft 24 screw-threaded throughout the greater part of its length, the shaft being rotated by driving gears 25 and 26 keyed to the shafts 11 and 24, respectively, whenever the cylinder is rotated. Thus, the stylus 22 is caused to traverse the cylinder in a longitudinal direction as the cylinder rotates, the pitch of the thread on the shaft 24 determining the extent of longitudinal traverse of the stylus during each rotation of the cylinder and hence the number of scanning lines per inch. In this manner the stylus point will describe a helical path as it moves over the surface of the telegraph blank and thus produce a scanning action.

After the blank has been scanned, it is taken off the cylinder and another blank placed thereon either for sending another telegram or for receiving a telegram, means being provided whereby the traveling carriage 23 may be manually returned to its starting position. The foregoing method of obtaining a scanning movement per se is well known, as are various other methods of electrically scanning a given field in facsimile transmission systems, and it is to be understood that any of the known methods of scanning by means of an electric stylus and suitable for the purpose may be employed in lieu of the foregoing method described.

The metallic cylinder 10 is electrically insulated from its associated apparatus, the electrical connection to the cylinder being made by means of a stationary brush or other contact member 28 which bears against the cylinder and electrically connects the cylinder to the ground leg of the signal circuit. The metallic leg 30 of the signal circuit is connected to the scanning stylus 22 which remains in contact with the surface of the transmitting sheet. A double pole double throw switch 31 when in its upper, or transmitting, position as shown, connects the leg 30 to a signal inverter 32, the output of the signal inverter being connected to a transmitting amplifier 34 for raising the signal level to any desired value. The signals in the output of the amplifier are transmitted over a circuit comprising conductor 35, switch 31, transmission line L, switch 31′ at station B, and conductor 36′ to the receiving amplifier 38′ where the signals are amplified and applied, by means of the switch 31′, conductor 30′, and electrical stylus 22′, to an electrosensitive recording blank 40. When synchronism of the rotating parts at stations A and B is properly maintained in any of the various ways known in the art, the message or image upon the blank 21 will be reproduced in facsimile upon the receiving blank 40 as scanning proceeds. Any suitable type of electrosensitive recording blank may be employed, for example, a blank such as disclosed in Patent No. 2,251,742, issued August 5, 1941.

Various of the known types of vacuum tube signal inverters may be employed at the station which is at the time transmitting a message. A simple form of such an inverter 32 may have connected thereto, through a potentiometer or tapped resistance unit, both positive and negative grounded battery so that when the stylus 22 is in contact with the conductive background of the transmitting blank 21, the positive potential is shunted from the grid circuit of the inverter tube by the conductive path through the stylus circuit, at which time the negative biasing potential on the grid of the inverter tube renders the tube non-conducting, but when the stylus point is in contact with any of the insulating or high resistance characters 20 of the message, the stylus circuit either is open or its resistance is greatly increased and the positive potential is applied to the grid of the inverter tube to render the tube conducting and its plate circuit causes signals to be impressed upon the input circuit of the amplifier 34. The kind of inverter employed and likewise the kind of amplifier, however, does not comprise my invention and are not shown in detail since such devices and their manner of operation are well known in the art. The receiving amplifier 38′ which amplifies the received signals to a suitable level causes marking potential of the proper value to be applied intermittently by the stylus 23 to properly mark the electrosensitive recording blank 40.

When it is desired to transmit from station B to station A, a transmitting blank such as the blank 21 is placed on the drum 10′ at station B, and a recording blank such as 40 is placed on the drum 10 of station A; the switch 31 is thrown to its lower, or receiving, position and switch 31′ to its upper, or transmitting, position. Transmission from station B and reception at station A involves the same operations as above described with respect to transmission from the opposite direction, the apparatus at the two stations being identical.

Instead of employing direct current circuits for transmission over line L, it is to be understood that the signals generated at the station which is transmitting may be used to modulate a carrier current in known manner for transmission of the signals between the stations, in which case a two-conductor metallic circuit preferably will be employed between the stations.

Fig. 2 illustrates how a handwritten transmitting blank embodying the invention may be prepared. Sheet 21 has a conducting surface 21*a* which may be obtained in various ways. For example, the body of sheet 21, which may be a sheet of ordinary paper, is made conductive either by impregnation with an electrolyte or by having a finely divided metal powder or finely divided carbon such as carbon black uniformly distributed throughout the pulp from which the paper sheet is rolled, so that when the point of the transmitting stylus is traversing unmarked areas of the sheet, signal current in the stylus circuit is readily conducted through the sheet to the underlying metal platen, such as the cylinder 10 shown in Fig. 1, on which the sheet is placed during a transmitting operation. Various examples of such electrolytes and conducting powders are disclosed in Patent No. 2,425,742, issued August 19, 1947. Preferably, finely divided carbon is employed to make the sheet conductive. The thickness of the paper 21 will depend upon the kind of stock used, for example, the thickness may vary from .0015 inch for tissue to .003 inch for thicker stock which comprises ordinary manila paper.

The conductivity of the sheet 21 must be sufficiently high to cause the transmitting stylus current readily to pass through the unmarked areas of the sheet. For example, a suitable degree of conductivity of a carbon impregnated sheet is such that if a metal plate is positioned under the sheet and an electrode whose area of contact surface is .5 sq. cm. is pressed on the upper surface of the sheet with a pressure of approximately 500 grams, the electrical resistance of the paper is approximately from 42 to 58 ohms. The resistance of papers impregnated with electrolytes will be found to be higher and may be as high ast several times that of the carbon impregnated paper. It will be appreciated by those versed in the facsimile art that the necessary conductivity of the paper may vary within considerable limits and yet produce suitable signals, depending upon various factors such as the voltage of the stylus current, the thickness of the paper 21, the speed at which the transmitter is to operate, and the frequency of the signal current in the stylus circuit when alternating current is employed.

Superimposed on the conductive blank 21 is a sheet of paper 41 having on the undersurface thereof a coating 41*a* which preferably is an insulating composition having the characteristics of, and compounded in accordance with, any of the various examples hereinafter given, Pressure exerted by means of a pencil or other marking stylus 42 when writing the message on the upper surface of sheet 41, causes transfer of the coating 41*a* to the upper surface of blank 21 and impresses thereon either insulating or high resistance characters 20 corresponding to the characters written on the sheet 41. When the transmitting stylus 22 engages dielectric characters or other subject matter impressed on the surface of the sheet 21, the stylus circuit is interrupted and current does not flow therein so long as the stylus is in contact with the insulating characters, whereby there are transmitted facsimile signals representative of the subject matter being scanned by the transmitter.

Fig. 3 is a fragmentary view of a typewriter in which the sheets 21 and 41 are inserted, the sheets passing between the typewriter platen 43 and a paper guide 44 and a line guide 45. The insulating characters 20 are impressed on the surface of the conductive sheet 21 as the letters or characters of the telegram or other message are struck by type bars 46 which pass between a typewriter bar guide member 47 to strike a conventional typewriter ribbon 48 against the sheet 41 and impress thereon the characters carried by the type bars. The resultant dielectric characters are impressed upon the blank 21 to cause facsimile signals to be generated and transmitted in the manner described above in respect to Figs. 1 and 2.

Commercial carbon and similar transfer papers, even though available in a variety of compositions and colors, were found to be unsuitable for use in impressing the dielectric characters 20 onto the surface 21*a* of the transmitting sheet. Such commercial transfer papers usually have a relatively hard coating with a thickness of approximately .0002 inch, and the coating is formulated to be used over and over again so that only partial transfer of the coating results at each writing or typing operation. The coating 41*a*, however, is softer than the coatings on commercial transfer papers and is approximately .0006 of an inch thick, and transfer of the entire coating to the surface 21*a* to impress a character thereon is effected in any elemental area to which force is applied either by the pencil 42 or the type on the type bars 46, thereby to cause each of the impressed characters 20 to have approximately this thickness and insure not only good legibility of the characters on the transmitting blank 21 but also good legibility of the characters when reproduced on a fascimile recording blank.

The dielectric composition which preferably comprises the transfer coating 41a and the characters formed thereby possesses a number of special characteristics which make the same suitable for the purposes of the instant invention, as follows: They insure good legibility in the facsimile copy reproduced from the transmitting blank 21; the characters 20 should be substantially continuous throughout the area thereof; the characters should have good dielectric properties; the characters should have a sufficient thickness coupled with toughness and a low coefficient of friction as between the transmitting stylus point and the characters so that during scanning there will be no appreciable deformation of the characters and the transmitting blank may be scanned repeatedly if desired; and the transfer material should be sufficiently yielding and impressible as to fill the surface irregularities of the paper transmitting blank and cling to the fibers thereof.

The following formula represents a preferred example of a waxy transfer material for forming the coating 41*a* and having the characteristics above set forth:

| | Parts |
|---|---|
| Paraffin wax | 15 |
| Carnauba wax | 10 |
| Beeswax | 10 |
| Mineral oil, SAE 10 | 15 |
| Zinc sulphide | 50 |

In the above formula the paraffin provides a base; the carnauba wax increases the melting point and hardness of the composition; the beeswax gives the necessary tackiness thereto; the mineral oil or petrolatum provides a plasticizer; and the zinc sulphide gives a desired color and body to the composition, in this case producing a white transfer material so that the impressed dielectric characters 20 stand out in sharp contrast to the black surface 21*a* of the carbon impregnated transmitting blank 21. It will be understood that the composition may be given any desired color by employing other coloring materials in addition to or in lieu of the zinc sulphide.

Either a homogeneous mixture of waxes or a non-homogeneous mixture having more than one phase may be employed. A hardening wax such as ouricury may be used instead of the carnauba wax, and a microcrystalline hydrocarbon wax may be used in addition to or in lieu of the beeswax of the foregoing formula; also greases and solid fats, such as stearic acid and stearates, palm oil, sperm oil, tallow and the like may be use to replace the paraffin and the mineral oil, if desired. Resins or gums may be used to replace the hardeners, such as the carnauba and ouricury waxes, which resins or gums may compromise dammar gum, Congo gum, kauri gum, ester gum, rosin, shellac, coumarine resin, ethyl cellulose and polystyrene. Gum elemi may be used as a softener, this gum being an exception to the general rule that gums and resins harden wax compositions. If desired, gum rubber may be dissolved and incorporated to impart toughness and flexibility to the dielectric composition.

Another illustrative formula which may be employed is as follows:

| | Parts |
|---|---|
| Beeswax | 2 |
| Diglycol stearate | 1 |
| Titanium dioxide or zinc sulphide | 2 |

Non-waxy compositions may also be employed, such as illustrated by the following formula:

| | Parts |
|---|---|
| Cellulose nitrate (high viscosity) | 10 |
| Dibutyl phthalate | 45–50 |
| Zinc sulphide | 40 |
| Ethyl acetate—as required for regulating coating viscosity | |

In lieu of employing the various electrolytes or conductive powders hereinbefore referred to, the transmitting blank 21 may be made conductive by impregnating it during the scanning operation of the transmitting stylus, with salts which are conductive in non-aqueous solutions, such as certain salts of sodium, potassium and ammonium, and in which the solubility of such salts in a volatile liquid such as an alcohol, makes possible their use, as disclosed in Patent No. 2,181,533, issued November 28, 1939. A solution of one of these salts in an alcohol may be applied locally ahead of the stylus in the manner set forth in the aforesaid patent. This method is especially suitable when a waxy composition is employed for forming the dielectric characters since such composition has the property of repelling liquids such as alcohol and thereby the paper is made conductive except in those elemental areas where the insulating characters have been impressed. This enables a plain paper such as manila message blank stock to be used for the transmitting blank 21, without previous treatment, and the same machine and procedure used for alcohol-moistening recording as disclosed in the aforesaid patent, may be used for transmission of messages.

Instead of using the foregoing salts in solution in an alcohol, the body of the blank may initially be impregnated with the salts, and the alcohol applied locally ahead of the stylus, the salts going into solution in the alcohol to make the blank conductive except in those elemental areas where the insulating characters have been impressed. The alcohol evaporates after a short interval of time and the sheet dries out rapidly and therefore the tensile strength of the sheet is not affected. The alcohol does not raise the grain of the paper as would be the case if an aqueous solvent were employed, although for certain purposes or certain types of papers an aqueous solvent could be used, the solvent being applied directly or by humidification as disclosed in Patent No. 2,225,247, issued December 17, 1940.

An important advantage of the transmitting blank is that low voltage direct current may be utilized in the stylus pickup circuit. For instance, the voltage may be appreciably less than fifty volts, and excellent results have been obtained with potentials from twenty-five to thirty volts in the stylus circuit. With the instant method of transmission the upper limit of linear scanning speed has not yet been ascertained, but with the inherently conductive blank good results have been obtained at linear scanning speeds as high as 75 inches per second, in contrast to the conventional scanning speed of 24 inches per second currently employed in commercial traffic. If desired, alternating current of suitable frequencies, for example, 2500 cycles and higher, may be used in lieu of direct current in the stylus circuit, and the current in the stylus circuit is employed to modulate a carrier to produce the signals transmitted over the line.

In the illustrated embodiment of the invention the entire body of the blank 21 is made conductive, but if desired only the surface 21*a* need be conductive. This may be obtained by coating the sheet 21 with a suitable conducting layer incorporated in a suitable binder, for example, synthetic resins commonly used in lacquers, such as cellulose nitrate, or water soluble materials such as casein, starch and polyvinyl alcohol. Where the body 21 of the blank is non-conducting, the electrode 28 shown in Fig. 1 is in contact with the marginal edge of the conductive surface of the transmitting blank instead of being in contact with the metallic drum 10, thereby to complete the stylus circuit.

As hereinbefore set forth, the composition of the impressed characters preferably has good dielectric properties. However, even though the composition should be conductive to some extent, if the electrical resistance of the impressed characters is substantially higher than that of the conductive sheet 20 or layer 21*a*, the stylus pickup circuit can distinguish between the marked and unmarked areas of the transmitting blank and thus cause proper signals to be generated for controlling a transmitting circuit.

For brevity, the expression "is made conductive" is employed in a generic sense in the claims, wherever applicable, to define a blank or sheet which is made conductive either initially or after the message characters to be transmitted are applied thereto.

Various other substances having properties similar to those of the substances specifically mentioned herein for forming the dielectric characters or other component parts of the subject matter of the transmitting blank, and various other embodiments of the invention, will occur to those skilled in the art and, therefore, the particular substances and embodiments disclosed herein are to be considered in an illustrative sense rather than in a limiting sense.

What is claimed is:

1. In the art of facsimile transmission, the method of producing facsimile message signals which comprises forming the characters of the message by transferring to selected elemental areas of the surface of a transmitting blank that is made conductive a composition having an electrical resistance substantially higher than the resistance of said blank to provide characters of relatively high electrical resistance on a conductive background, scanning the transmitting blank with an electrical stylus, and causing facsimile signals to be transmitted in accordance with the difference in resistance between that of the characters scanned by said stylus and that of the unmarked conductive background.

2. A facsimile message transmitting blank comprising a base sheet having a surface adapted to be scanned by an electrical stylus of a facsimile transmitter, the surface of said sheet having impressed thereon message characters composed of an insulating composition which adheres to said surface and provides insulating characters thereon, whereby if the sheet is made conductive the current in the stylus circuit is interrupted when the stylus passes over the insulating characters.

3. A facsimile message transmitting blank comprising a base sheet having a conductive surface adapted to be operatively connected in circuit with the electrical scanning stylus of a facsimile transmitter, the conductive surface of said sheet having impressed thereon message characters composed of an insulating composition which adheres to said surface and provides insulating characters on a conductive background, whereby the current in the stylus circuit is interrupted when the stylus passes over the insulating characters.

4. A facsimile message transmitting blank comprising a base sheet having a surface adapted to be scanned by an electrical stylus of a facsimile transmitter, the surface of said sheet having impressed thereon message characters composed of an insulating composition which adheres to said surface and provides insulating characters thereon, whereby if the sheet is made conductive the current in the stylus circuit is interrupted when the stylus passes over the insulating characters, said insulating composition having a contrasting color with respect to that of said background to enable the message thereon readily to be read.

5. A facsimile message transmitting blank comprising a base sheet having a surface adapted to be scanned by an electrical stylus of a facsimile transmitter, the surface of said sheet having impressed thereon message characters composed of an insulating composition which adheres to said surface and provides insulating characters thereon, whereby if the sheet is made conductive the current in the stylus circuit is interrupted when the stylus passes over the insulating characters, the thickness of the impressed characters formed from the insulating composition being approximately .0006 inch.

6. A facsimile message transmitting blank comprising a base sheet having a surface adapted to be scanned by an electrical stylus of a facsimile transmitter, the surface of said sheet having typewritten thereon message characters composed of an insulating composition which adheres to said surface and provides typed insulating characters thereon, whereby if the sheet is made conductive the current in the stylus circuit is interrupted when the stylus passes over the insulating typed characters.

7. In the art of facsimile transmission, the method of producing facsimile message signals which comprises forming the characters of the message by transferring to selected elemental areas of the surface of a transmitting blank that is made conductive a waxy insulating composition having an electrical resistance substantially higher than the resistance of said blank to provide characters of relatively high electrical resistance on a conductive background, scanning the transmitting blank with an electrical stylus, and causing facsimile signals to be transmitted in accordance with the difference in resistance between that of the insulating characters scanned by said stylus and that of the unmarked conductive background.

8. A facsimile message transmitting blank comprising a base sheet having a surface adapted to be scanned by an electrical stylus of a facsimile transmitter, the surface of said sheet having impressed thereon message characters composed of a plastic insulating composition which adheres to said surface and provides insulating characters thereon, whereby if the sheet is made conductive the current in the stylus circuit is interrupted when the stylus passes over the insulating characters.

9. A facsimile message transmitting blank comprising a base sheet having a surface adapted to be scanned by an electrical stylus of a facsimile transmitter, the surface of said sheet having impressed thereon message characters composed of a waxy insulating composition which adheres to said surface and provides insulating characters thereon, whereby if the sheet is made conductive the current in the stylus circuit is interrupted when the stylus passes over the insulating characters.

BERNARD L. KLINE.

REFERENCES CITED

The following references are of record in the file of this patent:

UNITED STATES PATENTS

| Number | Name | Date |
|---|---|---|
| 2,153,858 | Wise | Apr. 11, 1939 |
| 2,301,024 | D'Humy | Nov. 3, 1942 |
| 2,340,317 | Finch | Feb. 1, 1944 |
| 2,425,742 | Kline | Aug. 19, 1947 |